United States Patent
Rivard

[15] 3,665,949
[45] May 30, 1972

[54] GASEOUS CONTROLLED FLUIDIC THROTTLING VALVE

[72] Inventor: Jerome G. Rivard, Birmingham, Mich.
[73] Assignee: The Bendix Corporation
[22] Filed: June 27, 1969
[21] Appl. No.: 837,217

[52] U.S. Cl. ............................ 137/81.5, 137/251, 261/76, 138/45, 123/120
[51] Int. Cl. ............................................................ F15c 1/00
[58] Field of Search ........................ 137/81.5, 12, 14, 251; 251/118, 124; 261/75, 76, 78; 239/543, 544, 434.5; 60/243, 39.28; 73/207; 138/45; 123/120

[56] References Cited

UNITED STATES PATENTS

| | | | |
|---|---|---|---|
| 2,265,737 | 12/1941 | McMahan | 137/81.5 |
| 2,948,148 | 8/1960 | D'Anfreville et al. | 137/81.5 X |
| 3,039,490 | 6/1962 | Carlson, Jr. | 137/81.5 |
| 3,267,949 | 8/1966 | Adams | 137/81.5 |
| 3,389,894 | 6/1968 | Binder | 137/81.5 X |
| 3,474,813 | 10/1969 | Servanty et al. | 137/81.5 |
| 1,112,066 | 9/1914 | Hollis | 138/45 X |
| 3,163,329 | 12/1964 | Mornas | 138/45 X |
| 3,253,307 | 5/1966 | Griffiths et al. | 251/118 X |

*Primary Examiner*—William R. Cline
*Attorney*—William F. Thornton and Plante, Hartz, Smith & Thompson

[57] ABSTRACT

A fluidic throttling valve for controlling flow in a pipe or conduit of a high density fluid, such as a liquid, by injecting a lower density fluid, such as an inert gas, into the pipe. In the preferred embodiment shown herein, this control gas is injected into a pipeline leading to a combustion engine to control the quantity of liquid flowing through that pipeline. The control gas is injected through a slot extending completely around the circumference of the pipe. The gas is injected at the throat section of a venturi constructed in the pipe to define a point of minimal cross-sectional area.

11 Claims, 5 Drawing Figures

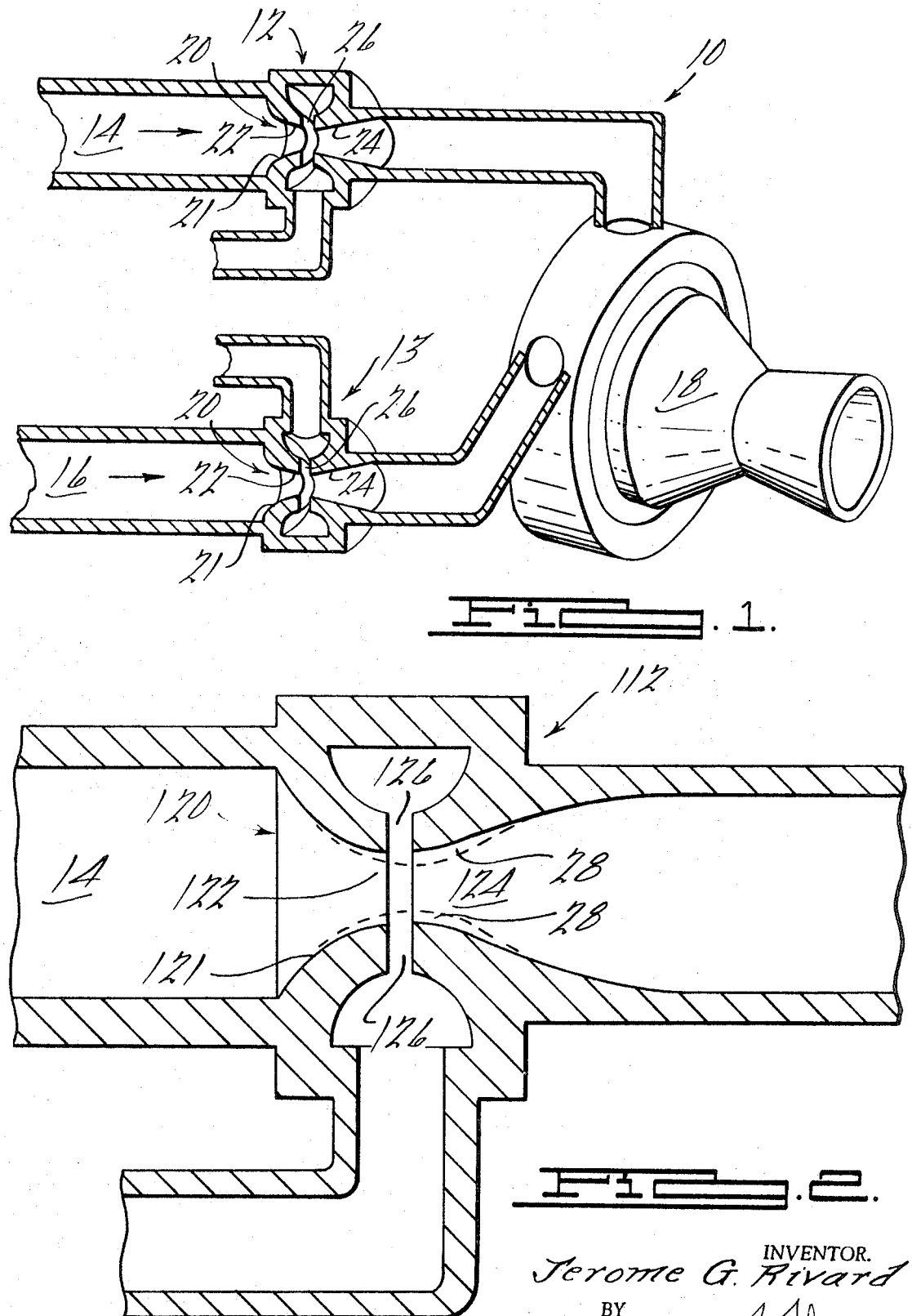

INVENTOR.
Jerome G. Rivard

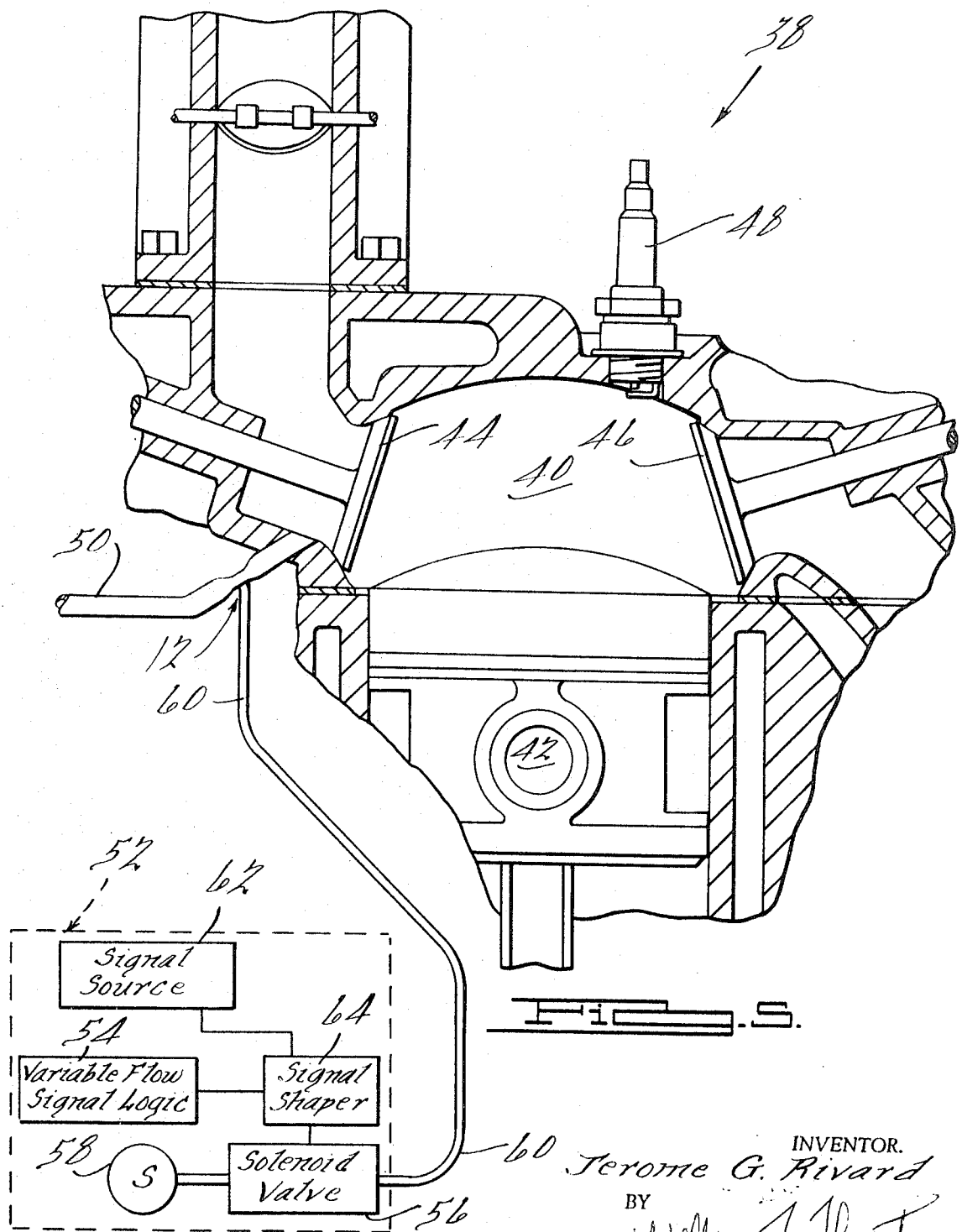

GASEOUS CONTROLLED FLUIDIC THROTTLING VALVE

BACKGROUND OF THE INVENTION

1. Field of the Invention

Throttling valve for regulating the mass of fluid flowing in a conduit.

2. Description of the Prior Art

It is well known by those skilled in the art that the quantity of a liquid flowing in a conduit or pipeline can be altered by injecting a gas into that conduit. One device designed for regulating flow in this manner consists of a small gas injector pipe disposed within a larger liquid flow conduit. A control gas is injected into the flow conduit through a hole or holes in the injector pipe. As the gas enters the flow conduit, it displaces the flowing liquid. Therefore, as more gas is injected into the conduit, less liquid will flow. Since the injected gas has a molecular weight much lighter than the flowing liquid, the total mass of fluid flowing in a conduit can be considerably altered by this device. However, this device possesses a number of faults that the valve of this invention overcomes. For instance, it takes a substantial quantity of gas to control liquid flow with the above described device. In addition, the injector pipe disposed within the flow conduit creates a flow disturbance and resulting energy losses which make it difficult to precisely control flow pressure downstream from the valve. Further, an even mixing of the control gas and liquid is not achieved with the above described device which limits its usefulness for situations in which it is desired to reduce but not completely stop the liquid flow.

It is also well known that a venturi can be constructed in a flow line and used to define a point of minimal cross-sectional area for that flow line. The static pressure of the flowing liquid will be at a minimum at this point of minimal cross-sectional area. A fluid injected into the flow line at this point will therefore meet with less resistance from the fluid flowing along the line than would be the case if that fluid were injected at some other point. A number of devices make use of these well known principles. One such device augments the mass of fluid flowing to a rocket engine by injecting a liquid into a gas flow line at the throat of a venturi when it is desired to increase the mass of fluid flowing to the rocket engine. Most carburetors also inject liquid fuel into the gaseous air flow line at the throat of a venturi.

However, the above described venturi-injection devices differ from the device of this invention in that they inject high density fluid into a flow line carrying a fluid of lower density for the purpose of increasing the mass of fluid flowing per unit of time. They do not limit or restrict the flow of a high density fluid such as a liquid with a much less dense fluid such as a gas as does the valve of this invention.

SUMMARY OF THE INVENTION

This invention comprises an extremely efficient fluidic valve in which a small mass flow of low density fluid can be used to regulate the flow of large quantities of high density fluid. In the embodiments described herein, a gas is chosen to represent a low density fluid, while a liquid represents a high density fluid. The valve herein described can be used to both reduce or throttle, and to completely shut off a flowing liquid. The valve of this invention includes means for injecting a control gas into a conduit or pipe from an aperture in its wall. An even mixing of the control gas and flowing liquid is provided by one embodiment of the invention in which control gas is injected at a number of points around the periphery of a pipe, because the control gas will not have to penetrate as far to reach all portions of the flowing liquid as it would have to if it were injected only at a single point. In the preferred embodiments described herein, gas is injected into a pipe from a slot which extends around the circumference of that pipe. The control gas is also injected in the preferred embodiments shown herein at the throat of a venturi formed in the pipe. The term "venturi" is used herein as it is customarily used by those skilled in this art and defines any tube or conduit having a converging section, a throat section, and a diverging section. The converging section is designed to increase the velocity of the fluid flowing in the conduit and therefore lower the static pressure of that fluid with a minimum energy loss. The diverging or diffuser section is constructed to gradually increase the cross-sectional area of the conduit to keep energy losses as low as possible and to effectively convert the increase in fluid velocity provided by the converging and throat sections of the venturi back to static pressure.

The valve illustrated herein includes a number of unique design features which provide distinct advantages over other throttling valves. First, the venturi throat which defines the minimum cross-sectional area of this valve is designed to be as small as possible so that the quantity of control gas needed to regulate liquid flow will be minimized. That is, when a control gas is injected at a venturi throat where the cross-sectional flow area is minimized, the quantity of gas required to displace a given quantity of liquid flow is less than that which would be required if the gas were injected into the flow conduit at another point having a larger cross-sectional area. Thus a smaller volume of gas can be used to regulate flow than is possible with other devices. The minimum cross-sectional area established by the venturi throat section also provides a second advantage in that it aids mixing of the control gas and the flowing liquid. Mixing is aided because the control gas need not travel so far to completely penetrate and mix with the flowing liquid. And finally, since the liquid will be flowing fastest at this point of minimal cross-sectional area, its static pressure will be at a minimum. This static pressure is the pressure opposing perpendicular entry of the control gas into the flow conduit. Thus, control gas can be injected into the venturi throat section at extremely low pressures to initiate throttling. As throttling is increased, the static pressure in the throat section also increases and reaches a maximum value when the control gas is injected into the valve at a sufficient rate to shut off the flowing liquid. However, the pressures needed to inject the control gas into the venturi throat section of this valve to provide a particular amount of throttling or to completely shut off the flowing liquid are small in comparison to the pressures needed by other fluidic valves. The flowing liquid can be completely shut off with this valve by injecting control gas at a pressure only slightly above the supply pressure of the flowing liquid.

Since the small venturi throat cross-section minimizes problems such as penetration of the flowing liquid by the control gas, in one embodiment the control gas is injected at an angle to the flowing liquid. The control gas thus acts to reduce the quantity of flowing liquid by both displacing the liquid from at least portions of the flow line and by blocking or opposing the momentum of the flowing liquid.

One embodiment shown herein illustrates the valve of this invention in a liquid flow line leading to a rocket engine; another embodiment illustrates the valve of this invention placed in a fuel line leading to an automobile combustion engine. The valve of this invention, which is defined by the appended claims, can certainly be included in a great number of other devices. It is believed however, that both the advantages and operating principles of this valve are particularly well illustrated when shown of unique advantages over other valves used to supply propellants to rocket engines and fuel to automobile engines. For example, propellant should be injected into a rocket engine at a fairly constant velocity regardless of the quantity of propellant flowing into that engine per unit of time. This constant velocity injection is necessary to assure even mixing of the two propellants, fuel and oxidizer, so that the engine will run smoothly. The valve of this invention provides a constant velocity output flow which is substantially independent of the amount of throttling being provided by the valves. The velocity of the flowing liquid will not significantly decrease when the control gas is injected into the line, because the injection of the control gas changes only the mass of fluid flowing from the valve and not the volume. It is also important that the control gas be completely mixed with the liquid propellants when that gas is being used to throttle rather than stop the rocket engine. Uneven mixing is provided between the control gas and flowing liquid with this valve because the liquid static pressure which acts to oppose this mixing is minimized, and because the control gas need not penetrate very far before it will have reached all portions of the flowing liquid. The inclusion of this valve in a fuel line leading to an automobile engine provides a unique advantage in that the quantity of liquid fuel flowing to that engine can be varied without varying either the velocity at which the fuel flows to that engine or the length of the time interval during each engine cycle in which fuel flows to the engine. This is of particular advantage for automobile engines because the time interval during which an automobile engine is adapted to receive fuel is lowest when the engine is running at high speeds or in other words when it needs the most fuel.

BRIEF DESCRIPTION OF THE DRAWINGS

Further objects, features and advantages of this invention will become apparent from a consideration of the following description, the appended claims, and the accompanying drawings in which:

FIG. 1 is a perspective view, partly in cross-section, of the injection valve of this invention shown in both the fuel and oxidizer lines to a combustor;

FIG. 2 is a perspective view of an embodiment of the injection valve of this invention in which the dimensions have been chosen so that vapor pockets form when liquid having a predetermined supply pressure passes through the valve;

FIG. 5 is a cross-sectional view of a portion of an automobile combustion engine embodying one design of the gas injection valve of this invention in an engine fuel line.

DETAILED DESCRIPTION OF THE PREFERRED EMBODIMENTS

Figure 3:
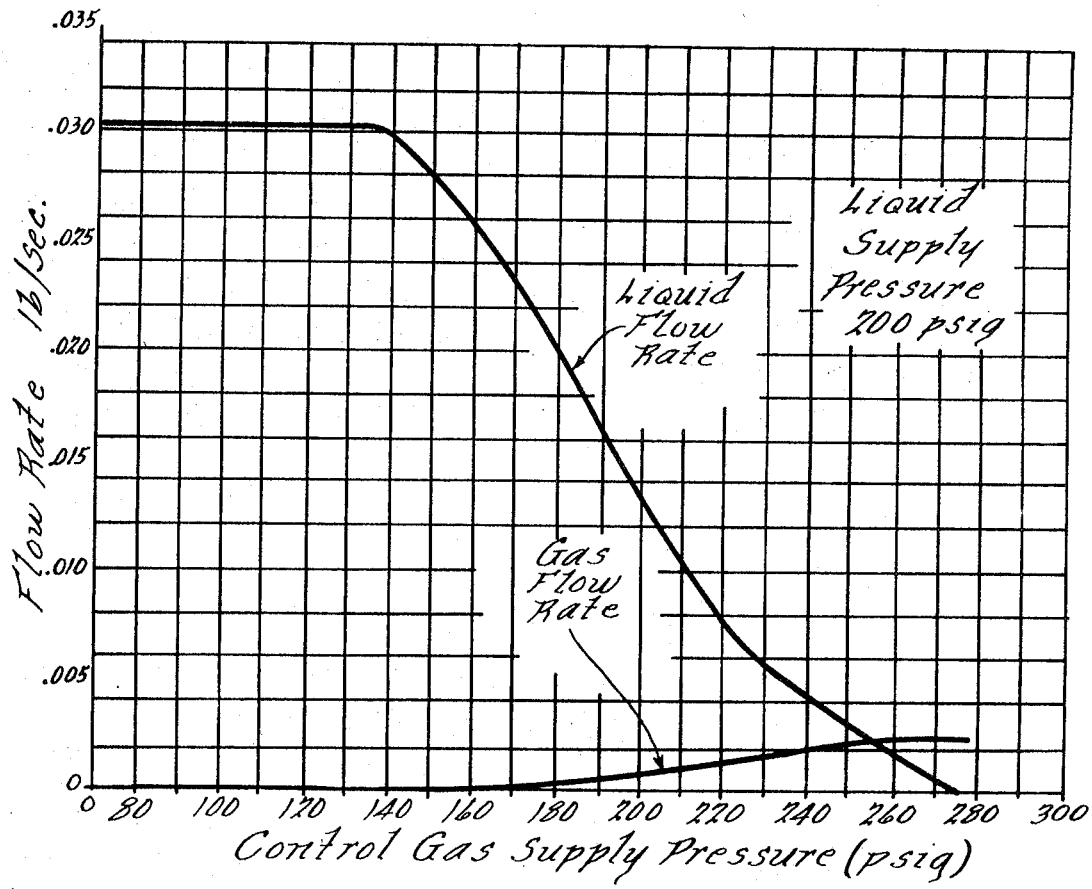
FIG. 3 graphically illustrates the quantity of gas and injection pressures needed to control liquid flow with a typical valve of this invention.

With reference to the drawings, the rocket engine 10, illustrated in FIG. 1, includes two similarly designed fluidic valves 12 and 13, placed in a fuel pipeline 14 and an oxidizer pipeline 16 respectively leading to a rocket engine combustion chamber 18. A detailed description will be provided herein for the valve 12; it is understood that the construction, operation, and design consideration described below for the valve 12 also applies to the valve 13. The valve 12 includes a venturi 20, having a converging section 21, a venturi throat section 22 and a venturi diffuser or recovery section 24. The venturi throat section 22 establishes a point of minimal cross-sectional area ($A_t$) for the flow line 14. Injection slot 26 extends completely around the inner circumference of the venturi throat at this point of minimal cross-sectional area. Thus, a solid sheet of control gas will be directed at the flowing liquid so that there will be a maximum mixing of the two fluids.

The minimum cross-sectional area $A_t$ of the venturi throat 22 is designed to be as small as possible and also maintain the static pressure of the flowing liquid in the venturi throat slightly above the vapor pressure of that liquid. The minimum cross-sectional throat area for the valve 12 is determined by the maximum quantity of liquid it is desired to have flow through the flow line 14. A pipeline may be reduced in size and still pass a given quantity of liquid per unit of time if the liquid supply pressure is increased. However, if this is done, the velocity of the flowing liquid at the reduced area will increase and its static pressure will decrease. The minimum cross-sectional area of the venturi throat 22 is chosen so that when the maximum quantity of liquid needed by the rocket engine 10 per unit of time flows through the line 14, the static pressure in the venturi throat 22 will be at or just above the vapor pressure of that liquid. Thus, the cross-sectional area of the venturi throat 22 is minimized and no vaporization of the flowing liquid occurs in that throat. The numerical value of this minimum cross-sectional area $A_t$ is determined using the following equation:

$$\omega_l = C_d A_t \sqrt{2g \rho_l (P_l - P_t)} \qquad (1)$$

where
$\omega_l$ = the liquid weight rate of flow
$A_t$ = venturi throat area
$\rho_l$ = liquid density
$P_l$ = liquid supply pressure
$C_d$ = coefficient of discharge
$P_t$ = throat pressure
$g$ = gravitational acceleration The quantities $\omega_l$, $\rho_l$, $C_d$, $P_l$, and $g$ will be determined in advance by the nature of the engine system 10 and rocket combustor 18. If the system is such that the liquid supply pressure can be varied, the maximum liquid supply pressure would be substituted into the above equation. The valve 12 is designed so that there will be no energy losses caused by vaporization of the flowing liquid in the valve 12. A pressure just slightly above the vapor pressure of the liquid would therefore be substituted for $P_t$ in the above equation. Straightforward calculation produces the value of the minimum venturi throat cross-sectional area $A_t$. Since both the flow cross-sectional area $A_t$ and the liquid static pressure are minimized, a very small quantity of gas, which may be injected at low pressures, will control the quantity of flowing liquid.

The diffuser or recovery portion 24 of the valve 12 has been chosen to have a gradual cross-sectional area increase. This provides for a high pressure recovery downstream from the venturi valve. With the valve shown by the diagram of FIG. 1, the static pressure of the liquid downstream from the venturi valve can be as high as nine-tenths of the static pressure of that liquid upstream from the valve. There will be no significant heat energy or pressure losses as the liquid fuel flows through the valve 12. The venturi design provides a smooth, tapered change in cross-sectional area so that energy will not be wasted in a turbulent flow resulting from an abrupt change in the cross-sectional flow area in the pipe as is the case for other valves having obstructions which are not shaped to form a venturi. Thus the pressure, and therefore the velocity, at which fuel enters the combustion chamber 18 can be precisely and efficiently controlled upstream from the valve 12.

In some situations however, it will be desirable to operate the valve 112, as shown in FIG. 2, that is, as a cavitating venturi valve. As used herein, the term "cavitating venturi" refers to any venturi in which the static pressure of the flowing fluid at some point is equal to the vapor pressure of that fluid so that a portion of the flowing liquid vaporizes. Vapor pockets 28 are shown in FIG. 2. A cavitating venturi valve differs from a non-cavitating venturi valve in that there is a larger net liquid static pressure loss across the cavitating valve than across the non-cavitating valve. That is, as has already been stated, the static pressure of the liquid downstream from the valve 12 illustrated in FIG. 1 can be as high as nine-tenths of the static pressure of the liquid upstream from that valve. In typical operation the maximum static pressure for liquid downstream from the valve 112 illustrated in FIG. 2 is about six-tenths of the static pressure of the liquid upstream from the valve 112. There are a number of ways of increasing the static pressure drop across a venturi and thus providing a cavitating venturi. For instance, the valve 12 illustrated in FIG. 1 could be made to operate as a cavitating venturi valve simply by reducing the load, or flow restriction, downstream from that valve. However, either the combustion chamber 18 or the flow line leading to that chamber would have to be changed in order to accomplish this change in downstream flow restriction. The cavitation illustrated in FIG. 2 is provided by a change in the design of the valve 112 from that of the valve 12, and not by any change downstream from that valve. Valve 112 is similar to valve 12 and includes a venturi 120 having a converging section 121, a throat section 122, and a diverging section 124.

Control gas is injected into the valve at the venturi throat section 122 through an injection slot 126. Cavitation is provided because the minimum cross-sectional area $A_t$ of the venturi throat section 122 is smaller than the minimum cross-sectional area of the throat section 22 of valve 12 and because the liquid supply pressure of liquid flowing to valve 112 is higher than the liquid supply pressure of liquid flowing to valve 12. The exact numerical value of the liquid supply pressure required to transmit any given weight rate of liquid flow $\omega_l$ through any given minimum throat cross-sectional area $A_t$ can be calculated from equation (1). The numerical value of the minimum throat cross-sectional area $A_t$ is chosen in accordance with the amount of cavitation desired.

When a valve operates as shown in FIG. 2, it acts to isolate the flow rate from pressure fluctuations downstream from the venturi throat. That is, a pressure fluctuation downstream from the valve 112, due to say a combustion instability in the engine, will not affect the quantity of liquid flowing from that cavitating venturi valve. An increase in downstream pressure merely acts to decrease the pressure differential across the valve 112, and therefore decreases the size of the vapor pockets 28. As the quantity of vapor in a venturi throat 122 decreases, the effective cross-sectional area of the venturi increases so that even though the pressure differential across the valve has been decreased, the quantity of liquid flowing from that valve will not change. Hence, the valve shown in FIG. 2 provides a constant quantity of liquid flow, not influenced by pressure fluctuations downstream from the valve. Because of this insensitivity to pressure fluctuations, the cavitating venturi valve shown in FIG. 2 will be used in a number of instances even though a greater supply pressure $P_l$ must be used to maintain a given liquid flow than is necessary to maintain the same flow rate through the valve shown in the diagram of FIG. 1, and even though heat energy and therefore pressure losses are introduced due to the vaporizing of the liquid in the venturi throat 122. With the valve 112 operating as shown in the diagram of FIG. 2, a combustion instability in an engine cannot start a damaging dynamic pressure instability that could ultimately cause the engine to explode as can be the case with other control valves. That is, one downstream pressure fluctuation will not influence the quantity of liquid that will subsequently flow from the valve 112. With other valves, such a fluctuation can produce an even greater subsequent pressure fluctuation in the burning engine and start a chain reaction of increasing pressure fluctuations causing increasingly violent and uneven explosions in the engine.

FIG. 3 illustrates the operation of the valve of this invention and shows that a very small volume of gas, injected at moderately low pressures into the flow line 14, will control liquid flow in that line. As discussed above, the venturi throat is chosen to establish a point of minimal cross-sectional area $A_t$ for the flow line 14. Thus a minimum quantity of gas can be used to control liquid flow. Since $A_t$ is minimized, the liquid will flow with maximum velocity and have a minimum static pressure acting to oppose the injection of the control gas. Therefore, a minimum pressure is needed to inject the control gas into the line 14 and mix two fluids which do not readily mix under ordinary circumstances.

FIG. 3 graphically illustrates control of a liquid rocket fuel, 50 percent UDMH and 50 percent hydrazine, flowing through the venturi valve 12 having a minimum throat cross-sectional area of 0.000552 sq. in. The liquid supply pressure is maintained at 200 lbs. per sq. in. Nitrogen, an inert gas, is used to control the liquid flow. It will be seen from this graph that 0.03 lbs. of liquid fuel flow through the completely opened valve per second. As the control gas is injected into the throat 22 of the venturi 12, it mixes with the flowing liquid and increases the throat pressure $P_t$. As more gas flows into the venturi throat section 22, throat pressure $P_t$ increases so that it ultimately equals the liquid supply pressure $P_l$. At this point no liquid flows from the valve 12. It will be seen from the graph of FIG. 3 that a control gas supply pressure of 280 lbs. per sq. in. and a gas flow of only 0.003 lbs. per second will completely stop flow of the rocket fuel so that only the nitrogen control gas will flow from the valve 12.

The information supplied by the graph of FIG. 3 can be determined experimentally for a valve having any minimum cross-sectional flow area, injection slot area, liquid supply pressure, and control gas injection pressure. The quantity of control gas and pressure at which that gas must be injected in order to stop liquid flow from any valve construction can also be determined mathematically using the compressible flow orifice equations which are well known to those skilled in the art.

Figure 4:
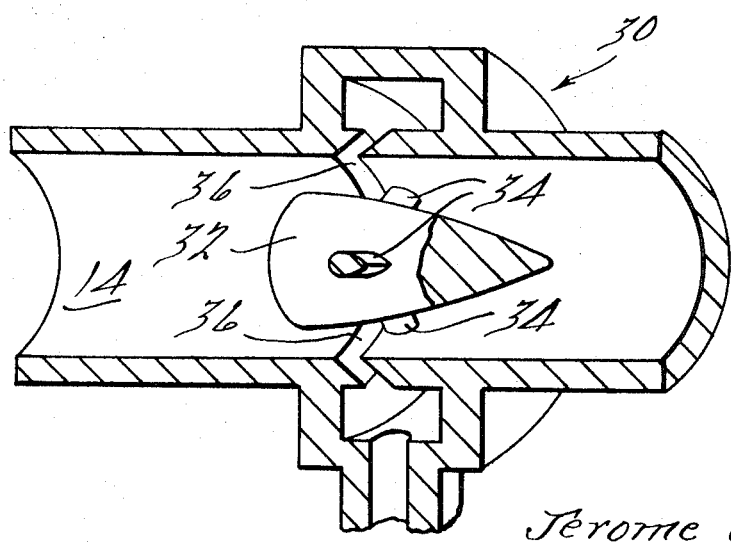
FIG. 4 is a perspective and cross-sectional view showing a modified embodiment of the valve of this invention.

FIG. 4 shows an alternate venturi valve design from that shown in FIGS. 1 and 2. FIG. 4 illustrates a fluidic valve 30 in which a water droplet shaped obstruction 32 is held in the liquid flow line by thin air foil shaped members 34 to form the venturi portion of the flow line. The use of the water droplet shaped obstruction 32 is not a significant change from the design illustrated in FIGS. 1 and 2 and is merely shown to illustrate the second well known way of providing a venturi in a flow line. The valve 30 differs significantly from the valve 12, however, in that the control gas is injected at an angle to the main flow line rather than perpendicular to that flow line. A control gas is injected into the flow line 14 at the venturi throat through an injection slot 36. The injection slot 36 is constructed at an opposing angle to the flow line 14 so that the momentum of the incoming control gas acts not only to cause that gas to penetrate the flowing liquid, but also acts to block the flowing liquid. When the control gas is injected perpendicular to the liquid flow, its entire momentum acts to penetrate the flowing liquid. If the gas were injected in a direction exactly opposed to the liquid flow, the entire injection momentum would act to block or stop the flowing liquid. When the angle of injection is chosen for maximum penetration, there will be a minimal force acting to block the liquid, and conversely when the maximum blocking is obtained, penetration is minimized. Since it is desirable to have the control gas both block and penetrate the flowing liquid, the valve design shown in FIG. 4, in which the control gas is injected with components of motion both perpendicular to and parallel to the flowing liquid, is an optimum one for many applications.

FIG. 5 shows the fluidic valve of this invention used to control the quantity of fuel flowing to a combustion chamber of a piston engine. The engine 38 illustrated in FIG. 5 includes a cylinder of a typical automobile engine which includes a combustion chamber 40, piston 42, intake valve 44, exhaust valve 46, and spark plug 48. Since the construction and operation of piston engines is well known, these elements will only be discussed herein to illustrate their relationship to the operation of the fluidic valve 12 which is shown in FIG. 5 placed in a fuel flow line 50. The basic description of the valve 12 has also already been provided above and will not be repeated here. The valve 12, which is controlled by the pulse control apparatus 52, regulates the quantity of fuel that will flow to the engine during successive engine cycles. The control apparatus 52 includes a variable flow signal logic 54 which provides a control output signal in response to operator commands. This control output signal regulates a solenoid valve 56 and therefore determines the quantity of control gas that will flow from a source of control gas 58 through a pipeline 60 to the valve 12. The apparatus 52 is constructed so that the control signal from source 54 regulates valve 56 mediately rather than immediately. The mediate control of valve 56 is provided instead of attempting to operate directly with the output signal from the variable flow signal logic so that the operation of valve 56 can be coordinated with piston position of the operating engine. The control apparatus 52 therefore also includes a signal source 62 which provides a cyclic signal determined by engine speed. That is, signal source 62 provides a higher frequency signal when the engine 38 is running at a high rate of speed than when it is running at a low rate of speed. This cyclic signal is transmitted to a signal shaping apparatus 64 where it is modified in accordance with the nature of the control signal provided by source 54. This modified or shaped signal then operates the solenoid valve 56 directly.

The valve 12 and control apparatus 52 can operate in two different modes to control fuel flow through the line 50. That is, fuel flow can be controlled either by varying the length of time during each engine cycle in which fuel is allowed to flow from the valve 12, or by varying the quantity of fuel allowed to flow during a particular fixed time interval in successive engine cycles. This valve provides all of the previously described advantages, such as a constant velocity output flow substantially independent of the quantity of liquid flowing through the valve in each of the above described modes of operation. However, each mode of operation also provides several unique, additional advantages which are unique to that mode of operation.

Consider first the operation of the valve 12 when that valve is operating to monitor fuel flow by controlling the length of time during each engine cycle in which fuel is allowed to flow to the engine. In operation, suppose a particular engine speed is being maintained and an operator desires to increase that speed. To accomplish this speed increase, he provides an input to the variable flow signal logic 54 which produces a command signal for the signal shaping apparatus 64. This command signal modifies the signal shaping apparatus output signal so that the solenoid valve 56 will remain closed for a longer portion of each engine cycle. This decreases the time interval in each engine cycle during which control gas will shut off the valve 12 and in turn allows more fuel to flow to the engine. Similarly, if the operator desires to slow the engine speed, he merely activates the variable flow signal logic 54 to provide a signal to the signal shaping apparatus 64 which modifies the output signal of that apparatus to open the solenoid valve 56 for longer time intervals during each engine cycle. This increases the time during which control gas will shut off valve 12 and therefore reduces the time during which fuel is allowed to flow to the engine. The total amount of fuel supplied to the engine and therefore the engine speed is thereby reduced.

There are a number of advantages in constructing the control apparatus 52 to operate the valve 12 to control fuel flow by varying only the time intervals during which fuel is allowed to flow. One significant advantage of the above described system lies in the fact that such a system is relatively uncomplicated, inexpensive, and reliable. The control apparatus elements 54, 56, 62 and 64 are all simple, reliable and well known devices. The valve 56 is either opened completely to allow sufficient control gas to flow to the valve 12 to completely stop fuel flow, or the valve 56 is completely closed and allows no control gas to flow to the valve 12 so that fuel flow is completely unrestricted. No complicated apparatus is needed to provide any intermediate quantity of control gas flow.

However, there are a number of disadvantages in varying the quantity of fuel flowing to a piston engine by changing the length of a time interval during each engine cycle in which fuel is allowed to flow to the engine. One disadvantage lies in the fact that the time interval during which fuel must flow to an engine to maintain a desired engine speed is largest at high engine speeds when the intake portion of the engine cycle, that is the time during which valve 44 is opened, is smallest.

With the valve of this invention, the time interval during which fuel flows to the engine need not be changed in order to change the amount of fuel flowing to the engine. The quantity of fuel flowing to an engine during fuel intake can be varied by selecting a particular fixed time interval $t_o$ and varying the quantity of fuel allowed to flow to the engine during that time interval. Again, the solenoid valve 56 will be completely opened and enough control gas will be injected into the valve 12 at times other than during the intake time interval $t_o$ of an engine cycle so that no fuel will flow from the valve 12 at those times. Engine speed is controlled as follows. When it is desired to run the engines at maximum speed, valve 56 is completely closed during the time interval $t_o$ when fuel flows from the valve 12 to the combustion cylinder 40 so that no control gas will be injected into the fuel flow line at that time. When it is desired to run the engine at a slower speed, an operator provides an input for the variable flow signal logic 54 of a form so that that logic provides an output signal which modifies the output signal from the signal shaper 64 to partially open valve 56. Thus, some control gas will be injected into the valve 12 during the time interval $t_o$. The quantity of control gas injected during this time interval is selected so that it will not stop the fuel flow as is the case during other portions of an engine cycle, but is selected to reduce the quantity of fuel flowing to the engine. That is, when the engine runs at less than maximum speed, a mixture of fuel and control gas will flow from the valve 12 during the time interval $t_o$. At high engine speeds the mixture will contain a relatively high portion of fuel and low portion of control gas; at low engine speeds the relative quantities are changed so that more control gas and less fuel flows from the valve 12.

This valve provides a number of advantages when operating to control fuel flow by changing the quantity of fuel allowed to flow during a particular fixed time interval instead of changing the length of the time interval during which fuel is allowed to flow. First, fuel will flow from the valve 12 only during that portion of each engine cycle during which valve 44 is open and the cylinder 40 is adapted to receive fuel. It will be unnecessary to have fuel flow from the valve 12 during any other time interval even for extremely high engine speed. Second, this amplitude modulation, or in other words, the control of the quantity of fuel allowed to flow during a particular, fixed time interval, provides an extremely accurate control of the quantity of fuel allowed to flow to the engine. And finally, even though the quantity of fuel allowed to flow during a particular time interval will be different for high and low engine speeds, the velocity at which that fuel flows from the valve 12 will not change for high and low speeds. Thus, the engine system can be optimally designed to take advantage of a particular, known flow velocity of the fuel from the valve 12 to the combustion cylinders.

The fluidic valve 12 can be designed to possess a number of other operating characteristics which can be advantageous when the valve is placed in environments such as shown in FIG. 5. For instance, the valve 12 may be designed so that a fuel vapor rather than liquid fuel flows from the valve venturi throat. The design considerations for construction of a valve to vaporize fuel flowing through it would be the same as those discussed above with respect to FIGS. 1 and 2. If it is desired to have a vaporized fuel flow supplied to the passageway 56, the valve would be designed so that the static pressure of the flowing fuel in the venturi throat would be equal to the vapor pressure of the flowing fuel.

It will be noted with respect to FIG. 5 that the valve 12 is placed substantially at the end of the fuel flow line 50, and further that the diffuser portion 24 of that valve, that is the portion down-stream from the venturi throat, is chosen to be of a minimal length. This is done to make the fuel supply system completely and quickly responsive to changes in the pressure of the control gas. When the pressure of the control gas is increased to stop fuel flowing through the valve 12 there will be a very short lag time during which fuel that had been downstream from the point at which the control gas is injected into the fuel flow line continues to flow toward the combustion chamber 40. The change in pressure of the control gas will very quickly change the composition of the fluid flowing into the combustion cylinder. Thus, a very sensitive control is provided to exactly regulate the quantity of fuel flowing to an engine so that the proper amount of fuel flows only during the desired portion of an engine cycle.

From the above description, it will be seen that this invention comprises a gas injection valve in which a control gas, preferably an inert gas, is injected into a fluid flow line at the throat of a venturi formed in that line. The cross-sectional flow area of the venturi valve is minimized at the point at which the control gas is injected. The valve of this invention possesses a number of advantages over other valves. An extremely small quantity of a low density gas can be used to regulate and stop the flow of a high density liquid. When the valve is used to regulate rather than stop liquid flow completely, this valve provides an even mixing between the control gas and the flowing liquid. This valve also maintains relatively constant flow velocity regardless of the quantity of liquid flowing from this valve. These and other advantages make it particularly desirable to use this valve to control the liquid flow to a combustion engine. Of course, the numerated advantages will immediately suggest many other uses for this invention to those skilled in the art. It will therefore be understood that both the specific apparatus and application which are herein disclosed and described are presented for purposes of explanation and illustration and are not intended to indicate limits of the invention, the scope of which is defined by the following claims:

I claim:

1. A gas injection valve for controlling the quantity of liquid flowing in a conduit comprising:
    a venturi in the conduit;
    said venturi including a throat section having a preselected minimum cross sectional area for reducing the static pressure of the liquid flowing at a preselected rate to a preselected value; and
    means for injecting a control gas having a lower density than the density of the liquid into the conduit at said venturi throat section to control the quantity of liquid flowing in the conduit.

2. The valve set forth in claim 1 in which said minimum cross-sectional area is selected to reduce said static pressure for said liquid flowing at said preselected rate to a value just slightly above the vapor pressure of said flowing liquid at said point of minimum cross sectional area.

3. The valve set forth in claim 1 in which said cross-sectional area of said throat section is chosen in accordance with the equation $$\omega_l = C_d A_t \sqrt{2g \rho_l (P_l - P_t)}.$$

where:
  $\omega_l$ = the liquid weight rate of flow
  $A_t$ = venturi throat area
  $\rho_l$ = liquid density
  $P_l$ = liquid supply pressure
  $C_d$ = coefficient of discharge
  $P_t$ = throat pressure
  $g$ = gravitational acceleration.

4. The valve set forth in claim 3 in which said minimum cross-sectional area is chosen so that the static pressure of said flowing liquid in said venturi throat will approach but not reach the vapor pressure of that liquid when said liquid flows at said preselected rate.

5. The valve set forth in claim 1 in which said minimum cross-sectional area is chosen to cause a predetermined portion of said flowing liquid to vaporize when said liquid flows at a preselected rate.

6. The valve set forth in claim 1 in which said venturi includes a throat section and said injecting means includes a slot extending completely around the periphery of said venturi throat.

7. The valve set forth in claim 6 in which said injection slot is arranged at an opposing angle to the direction of liquid flow.

8. The valve set forth in claim 1 in which said control gas is an inert gas, and in which said injecting means is constructed to completely stop the liquid flow.

9. In the fuel line to a piston engine a fuel control gas injection valve comprising:
    a venturi formed in a section of the fuel line, said venturi including a throat section having a minimum cross-sectional area for reducing the static pressure of the fuel to a preselected value;
    means for injecting a control gas into the fuel line at said venturi throat; and
    means for controlling the rate of said injection of said control gas to determine the quantity of said fuel flowing in said line.

10. The injection valve set forth in claim 9 in which said means for controlling the rate of control gas injection is constructed to inject sufficient control gas to stop fuel flow during preselected portions of successive engine cycles, is constructed to allow fuel to flow through said fuel line during other portions of successive engine cycles, and is constructed to vary engine speeds by varying the pressure at which said control gas is injected into said fuel line during said other portions.

11. The injection valve set forth in claim 9 in which said means for controlling the rate of control gas injection is constructed to inject sufficient control gas into said fuel line to stop fuel flow during preselected portions of successive engine cycles, is constructed to allow fuel to flow through said fuel line during other portions of successive engine cycles, and is constructed to vary engine speeds by varying the relative time-lengths of said preselected and said other portions of successive engine cycles.

* * * * *